(12) United States Patent
Evans

(10) Patent No.: US 7,377,586 B2
(45) Date of Patent: May 27, 2008

(54) MODULAR SEAT BACK ASSEMBLY

(75) Inventor: Jonathan A. Evans, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/780,160

(22) Filed: Jul. 19, 2007

(65) Prior Publication Data

US 2008/0018161 A1    Jan. 24, 2008

Related U.S. Application Data

(60) Provisional application No. 60/832,434, filed on Jul. 21, 2006, provisional application No. 60/832,435, filed on Jul. 21, 2006.

(51) Int. Cl.
*B60N 2/68* (2006.01)
(52) U.S. Cl. .................................. 297/248; 297/452.18
(58) Field of Classification Search ................. 297/232, 297/248, 378.1, 378.12, 440.1, 440.2, 452.18
See application file for complete search history.

(56) References Cited

U.S. PATENT DOCUMENTS

| | | | | |
|---|---|---|---|---|
| 808,679 A | * | 1/1906 | Pickles | 297/248 |
| 5,104,065 A | * | 4/1992 | Daharsh et al. | 297/232 |
| 5,273,336 A | * | 12/1993 | Schubring et al. | 297/378.1 |
| 5,597,139 A | * | 1/1997 | Beroth | 297/248 |
| 5,716,100 A | * | 2/1998 | Lang | 297/378.12 |
| 6,543,845 B2 | * | 4/2003 | Seitz et al. | 297/248 |
| 2004/0041456 A1 | * | 3/2004 | Kinzer et al. | 297/452.18 |

* cited by examiner

*Primary Examiner*—Peter R. Brown
(74) *Attorney, Agent, or Firm*—Howard & Howard; David M. LaPrairie; Christopher M. Francis

(57) ABSTRACT

A modular seat back assembly includes first and second seat backs adjacent each other. The seat backs are selectively positionable relative to each other in a first and a second seating arrangement. A coupling member extends from the first seat back to the second seat back and is mounted to the first and second seat backs. The first and second seat backs each present one of a first pair of coupling bases and one of a second pair of coupling bases. The first pair is configured such that the coupling member is mountable to both of the first pair in the first seating arrangement. The second pair is configured such that the coupling member is mountable to both of the second pair in the second seating arrangement. The configuration of the first and second pair of coupling bases enables interchangeability of the seat backs in a cross-vehicle direction.

24 Claims, 7 Drawing Sheets

MODULAR SEAT BACK ASSEMBLY

CROSS-REFERENCE TO RELATED APPLICATIONS

The subject patent application claims priority to and all the benefits of U.S. Provisional Patent Application Ser. No. 60/832,434 which was filed on Jul. 21, 2006 and U.S. Provisional Patent Application Ser. No. 60/832,435 which was filed on Jul. 21, 2006, the specifications of both are herein incorporated by reference in their entirety.

BACKGROUND OF THE INVENTION

1. Field of the Invention

The present invention is related to seat back assemblies and specifically modular seat back assemblies for a vehicle.

2. Description of the Related Art

Seat back assemblies for a rear seat of a vehicle are configured in several arrangements dependent upon the vehicle model and style. Different vehicle models require different seat back assemblies and varying styles of the same model often require different seat back assemblies. In addition, some vehicles also have both second and third row seating with the seating arrangement being different between the second and third row seating. Different arrangements of seat back assemblies include bench seat arrangements and split seat arrangements. The bench seat arrangement includes a single continuous seat back. The split seat arrangement includes at least two adjacent seat backs with each of the adjacent seat backs independently moveable between an upright position and a folded position. The seat backs of the split seat arrangement have the same or different cross-car widths to achieve different split seat arrangements. The split seat arrangements typically include a 50/50 split, a 40/60 split, and a 40/20/40 split.

A modular seat back assembly includes at least two seat backs which may be selectively coupled in various arrangements. U.S. Pat. No. 4,793,505 to Yamawaki et al. discloses a modular seat back assembly. Yamawaki et al. discloses a first seat back and a second seat back adjacent the first seat back. In one arrangement, the first seat back and the second seat back are independently moveable between the upright and folded positions such that the modular seat back assembly has a split seat arrangement. In another arrangement, the modular seat back assembly includes a coupling member mounted to and extending from the first seat back to the second seat back such that the modular seat back assembly has a bench seat arrangement. Yamawaki et al. discloses a seat back assembly wherein the first and second seat backs are handed, i.e., the first seat back must be positioned to the left of the second seat back and the second seat back must be positioned to the right of the first seat back.

In a design where the seat backs are handed, a separate seat back must be manufactured for each split seat arrangement. For example, in a 60/40 split seat arrangement, a left seat back comprising 60% of the cross-vehicle width and a left seat back comprising 40% of the cross-vehicle width must be manufactured. In a 40/60 split seat arrangement, another left seat back comprising 40% of the cross-vehicle width and another left seat back comprising 60% of the cross-vehicle width must be manufactured. For each different split seat arrangement, a different right and left hand seat back must be manufactured.

In addition, the vehicle may or may not have wheel well features in the interior of the vehicle depending upon the model and style of the vehicle. In a configuration where the vehicle has wheel wells, the first and second seat backs each must define a wheel well cutout to accommodate the wheel well. In a configuration where the vehicle does not have a wheel well, the first and second seat backs each must have corners that conform to interior corners of the vehicle.

It would be desirable to manufacture a modular seat back assembly that is common to a variety of different vehicle models and styles such that the modular seat back assembly may be positioned into different bench seat/split seat arrangements to accommodate the configurations of the various models and styles and wheel well configurations.

SUMMARY OF THE INVENTION AND ADVANTAGES

The present invention is a modular seat back assembly for a vehicle. The modular seat back assembly includes a first seat back and a second seat back. The second seat back is adjacent the first seat back with the first and second seat backs selectively positionable relative to each other in a first seating arrangement and a second seating arrangement different than the first seating arrangement. A coupling member extends from the first seat back to the second seat back and is mounted to the first and second seat backs. The first and second seat backs each present one of a first pair of coupling bases. The first pair of coupling bases is configured such that the coupling member is mountable to both of the first pair of coupling bases when the first and second seats are in the first seating arrangement. The first and second seat backs each present one of a second pair of coupling bases spaced from each of the first pair of coupling bases. The second pair of coupling bases is configured such that the coupling member is mountable to both of the second pair of coupling bases when the first and second seats are in the second seating arrangement.

Accordingly, the first and second seat backs and the coupling member are selectively positionable in the first seating arrangement or the second seating arrangement depending upon the requirements of the vehicle. In other words, the first and second seat backs are interchangeable in a cross-vehicle direction and the first and second seat backs are arranged in the first seating arrangement or the second arrangement to accommodate the structure of the vehicle. The configuration of the first and second pairs of mounting bases enables such interchangeability because the coupling member is mountable to the first pair of mounting bases in the first seating arrangement and is mountable to the second pair of mounting bases in the second seating arrangement.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

Figure 1:
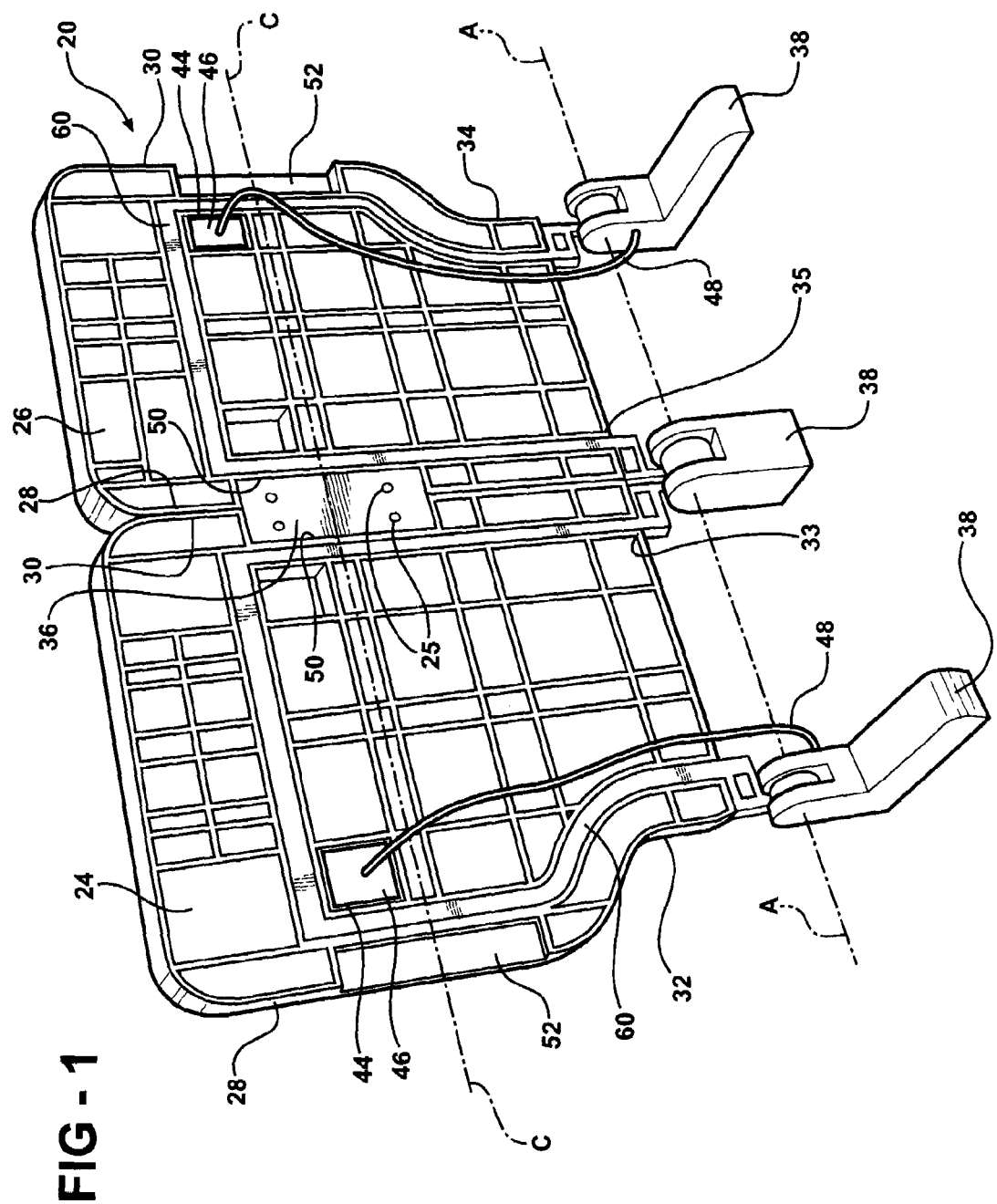
FIG. 1 is a perspective view of a first embodiment of a modular seat back assembly in a first seating arrangement.
Figure 2:
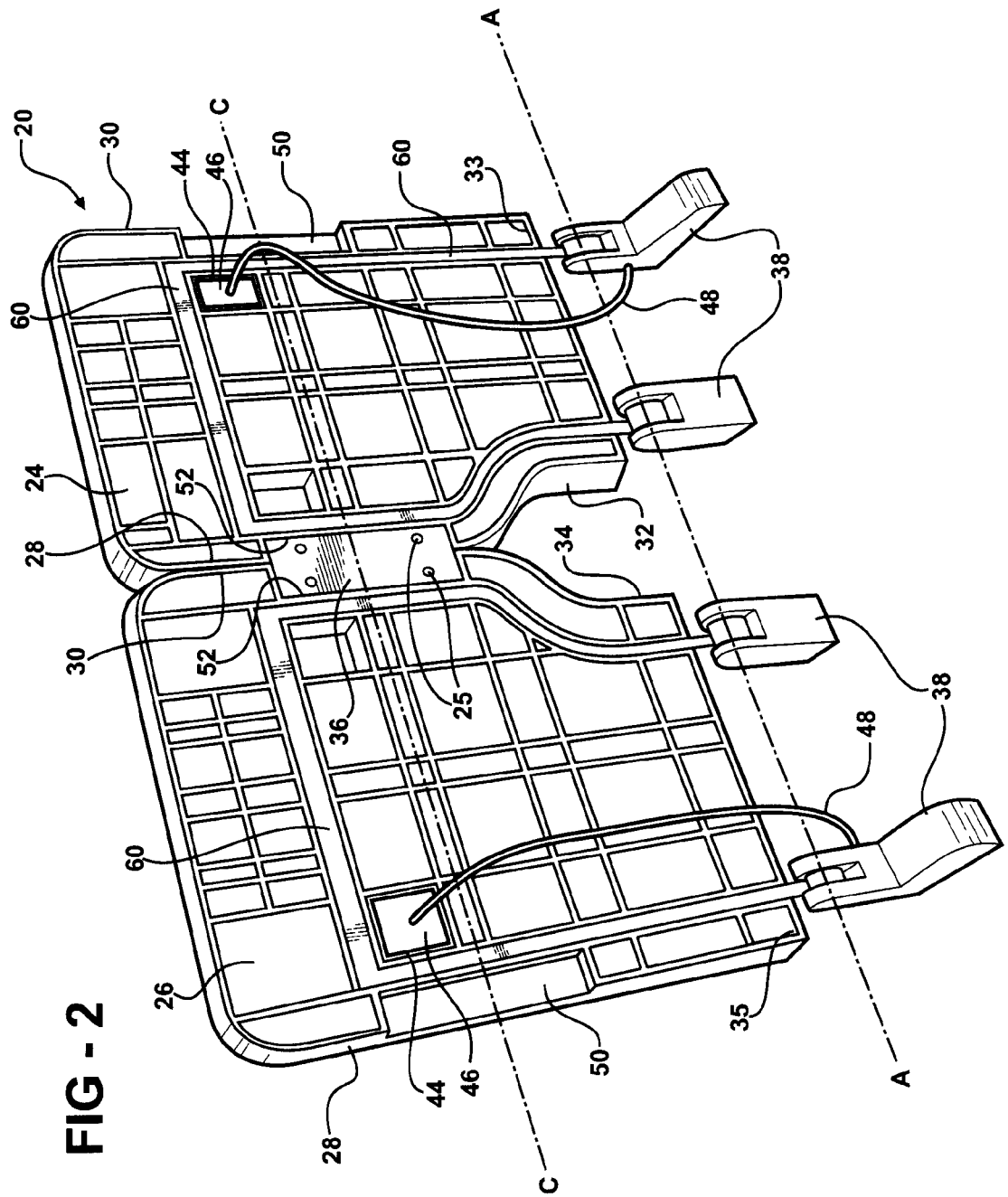
FIG. 2 is a perspective view of the first embodiment of the modular seat back assembly in a second seating arrangement.

Referring to the Figures, wherein like numerals indicate corresponding parts throughout the several views, a modular seat back assembly 20 for a vehicle 22 is generally shown. As shown in FIG. 7, for example, the modular seat back assembly 20 is further defined as a rear seat of an automobile such as a second or third row seat. It should be appreciated that the modular seat back assembly 20 may be further defined as any row of seats including a front row of seats. It should also be appreciated that the modular seat back assembly 20 may be used in any type of vehicle including, for example, a bus, an airplane, and a boat. As will be discussed further below, FIGS. 1-2 show a first embodiment of the modular seat back assembly 20 and FIGS. 3-7 show a second embodiment of the modular seat back assembly 20. The modular seat back assembly is mounted to the vehicle in conjunction with a seat bottom (not shown). The seat bottom extends generally horizontally for supporting a sitting passenger or cargo.

As shown in FIGS. 1-2, the first embodiment the modular seat back assembly 20 includes a first seat back 24 and a second seat back 26 adjacent the first seat back 24. Each of the first and second seat backs 24, 26 has a left end 28 and a right end 30. The first and second seat backs 24, 26 are preferably substantially equal in length from the left end 28 to the right end 30 respectively. In addition, preferably the left end 28 of the first seat back 24 defines a wheel well cutout 32 and the right end 30 of the second seat back 26 defines a second wheel well cutout 34. The right end 30 of the first seat back 24 presents a corner 33 and the left end 28 of the second seat back 26 presents a second corner 35.

The first and second seat backs 24, 26 are selectively positionable relative to each other in a first seating arrangement and a second seating arrangement different than the first seating arrangement. Specifically, as shown in FIG. 1, the right end 30 of the first seat back 24 is adjacent the left end 28 of the second seat back 26 in the first seating arrangement. As shown in FIG. 2, the left end 28 of the first seat back 24 is adjacent the right end 30 of the second seat back 26 in the second seating arrangement. In other words, the first and second seat backs 24, 26 are interchangeable in a cross-vehicle direction and the first and second seat backs 24, 26 are arranged in the first seating arrangement or the second seating arrangement to accommodate structure of the vehicle 22, e.g., cross-car width and wheel well features 23. As such, the first and second seat backs 24, 26 may be packaged together to meet design criteria requirements of individual vehicles. For example, the modular seat back assembly 20 may be configured in the first seating arrangement to fit a vehicle having wheel well features 23 and may be configured in the second seating arrangement for a vehicle not having wheel well features. In the first seating arrangement, the wheel well cutout 32 and the second wheel well cutout 34 accommodate the wheel well feature 23. In the second seating arrangement, the corner 33 and the second corner 35 conform to interior corners of the vehicle 22. As shown in FIGS. 1-2, a coupling member 36 extends from the first seat back 24 to the second seat back 26 and is mounted to the first and second seat backs 24, 26. Preferably, fasteners 25 are coupled to the coupling member 36 with each fastener 25 engaging one of the first and second seat backs 24, 26. For example, the fasteners 25 are further defined as threaded fasteners or rivets. The first and second seat backs 24, 26 are rotatable together about a rotational axis A. The coupling member 36 rigidly attaches the first and second seat backs 24, 26 together such that the first and second seat backs 24, 26 rotate as a unit about the rotational axis A.

The modular seat back assembly 20 includes a plurality of mount members 38, i.e., reclining brackets, for mounting the first and second seat backs 24, 26 to a floor 40 of the vehicle 22. The first and second seat backs 24, 26 are rotatably mounted to the plurality of mount members 38 such that the rotational axis A extends through the mount members 38.

The first seat back 24 and the second seat back 26 each preferably define a pair of apertures 42. A release mechanism 44 is disposed in at least one of the apertures 42. The release mechanism 44 includes a release handle 46 and a release cable 48 extending from the release handle 46. The release cable 48 is coupled to a latch disposed in one of the mount members 38. When in an upright position, the first and second seat backs 24, 26 are locked relative to the mount members 38 in the upright position. The release handle 46 is moved in the aperture 42 for unlocking the latch to unlock the first and second seat backs 24, 26 relative to the mount members 38 and to allow the first and second seat backs 24, 26 to rotate relative to the mount members 38 between the upright position and a folded position. In the upright position, the seat back extends generally vertically from the mount members, such as, for example, the first and second seat backs 24, 26 in FIG. 5. In the folded position, the seat back extends generally horizontally, such as, for example, the first seat back 24 in FIG. 6.

The first and second seat backs 24, 26 each present one of a first pair of coupling bases 50. In other words, the first seat back 24 presents one of the first pair of coupling bases 50 and the second seat back 26 presents the other of the first pair of coupling bases. Specifically, one of the first pair of coupling bases 50 extends from the right end 30 of the first seat back 24 toward the left end 28 of the first seat back 24 and another of the first pair of coupling bases 50 extends from the left end 28 of the second seat back 26 toward the right end 30 of the second seat back 26. In addition, the first and second seat backs 24, 26 each presents one of a second pair of coupling bases 52 spaced from each of the first pair of coupling base. In other words, the first seat back 24 presents one of the second pair of coupling bases 52 and the second seat back 26 presents another of the second pair of coupling bases 52. Specifically, one of the second pair of coupling bases 52 extends from the left end 28 of the first seat back 24 toward the right end 30 of the first seat back 24 and another of the second pair of coupling bases 52 extends from the right end 30 of the second seat back 26 toward the left end 28 of the second seat back 26.

The first pair of coupling bases 50 is configured such that the coupling member 36 is mountable to both of the first pair of coupling bases 50 when the first and second seats are in the first seating arrangement. The second pair of coupling bases 52 is configured such that the coupling member 36 is mountable to both of the second pair of coupling bases 52 when the first and second seats are in the second seating arrangement.

Specifically, the first and the second pair of coupling bases 50, 52 are configured with each of the first and second pairs of coupling bases 50, 52 disposed along a common axis C. As such, in the first seating arrangement the first pair of coupling bases 50 are adjacent and aligned with each other and in the second seating arrangement the second pair of coupling bases 52 are adjacent and aligned with each other. As shown in FIG. 1, in the first seating arrangement the first pair of coupling bases 50 are aligned with each other such that the coupling member 36 extends across both of the first pair of coupling bases 50. Further, as shown in FIG. 2, in the second seating arrangement the second pair of coupling base are aligned with each other such that the coupling member 36 extends across both of the second pair of coupling bases 52. In other words, the coupling member 36 is mountable to both the first and second seat backs 24, 26 regardless of the arrangement of the first and second seat backs 24, 26 relative to each other.

Each of the first and second pairs of coupling bases 50, 52 is planar. The coupling member 36 is further defined as a plate. The plate abuts each of the first pair of coupling bases 50 in the first seating arrangement and abuts each of the second pair of coupling bases 52 in the second seating arrangement. The plate is formed of metal and specifically is formed of aluminum. It should be appreciated that the plate may be formed from any suitable material for rigidly attaching the first and second seat backs 24, 26 together without departing from the nature of the present invention. It should also be appreciated that the first and second coupling bases 50, 52 and the coupling member 36 may be formed in any configuration such that the coupling member 36 is mountable to the first pair and the second pair of mounting bases 50, 52 without departing from the nature of the present invention.

As shown in FIGS. 3-7, the second embodiment the modular seat back assembly 20 includes a third seat back 56 disposed adjacent one of the first and second seat backs 24, 26. The third seat back 56 has a left end 28 and a right end 30. Preferably the first and third seat backs 24, 56 are substantially equal in length from the left end 28 to the right end 30, respectively, and each of the first and third seat backs 24, 56 are substantially twice as long as the first seat back 24 from the left end 28 to the right end 30, respectively. Preferably the left and right ends 28, 30 of the first seat back 24 are straight. The left end 28 of the third seat back 56 defines the wheel well cutout 32 and the right end 30 of the second seat back 26 defines the second wheel well cutout 34. The right end 30 of the third seat back 24 presents the corner 33 and the left end 28 of the second seat back 26 presents the second corner 35. It should be appreciated that the modular seat back assembly 20 may include any number of seat backs that are positionable in any number of arrangements without departing from the nature of the present invention.

When the first and second seat backs 24, 26 are positioned in the first seating arrangement, the third seat back 56 is selectively positionable adjacent the left end 28 of the first seat back 24 or adjacent the right end 30 of the second seat back 26. When the first and second seat backs 24, 26 are positioned in the second seating arrangement, the third seat back 56 is selectively positionable adjacent the right end 30 of the first seat back 24 or adjacent the left end 28 of the second seat back 26. In other words, the third seat back 56 is selectively positionable adjacent to any of the left or right end 28, 30 of the first or second seat backs 24, 26.

As such, the first, second, and third seat backs 24, 26, 56 may be packaged together to meet design criteria requirements of individual vehicles. For example, the modular seat back assembly 20 may be configured to fit a vehicle having wheel well features 23 present inside the vehicle, or for a vehicle not having wheel well features.

Figure 3:
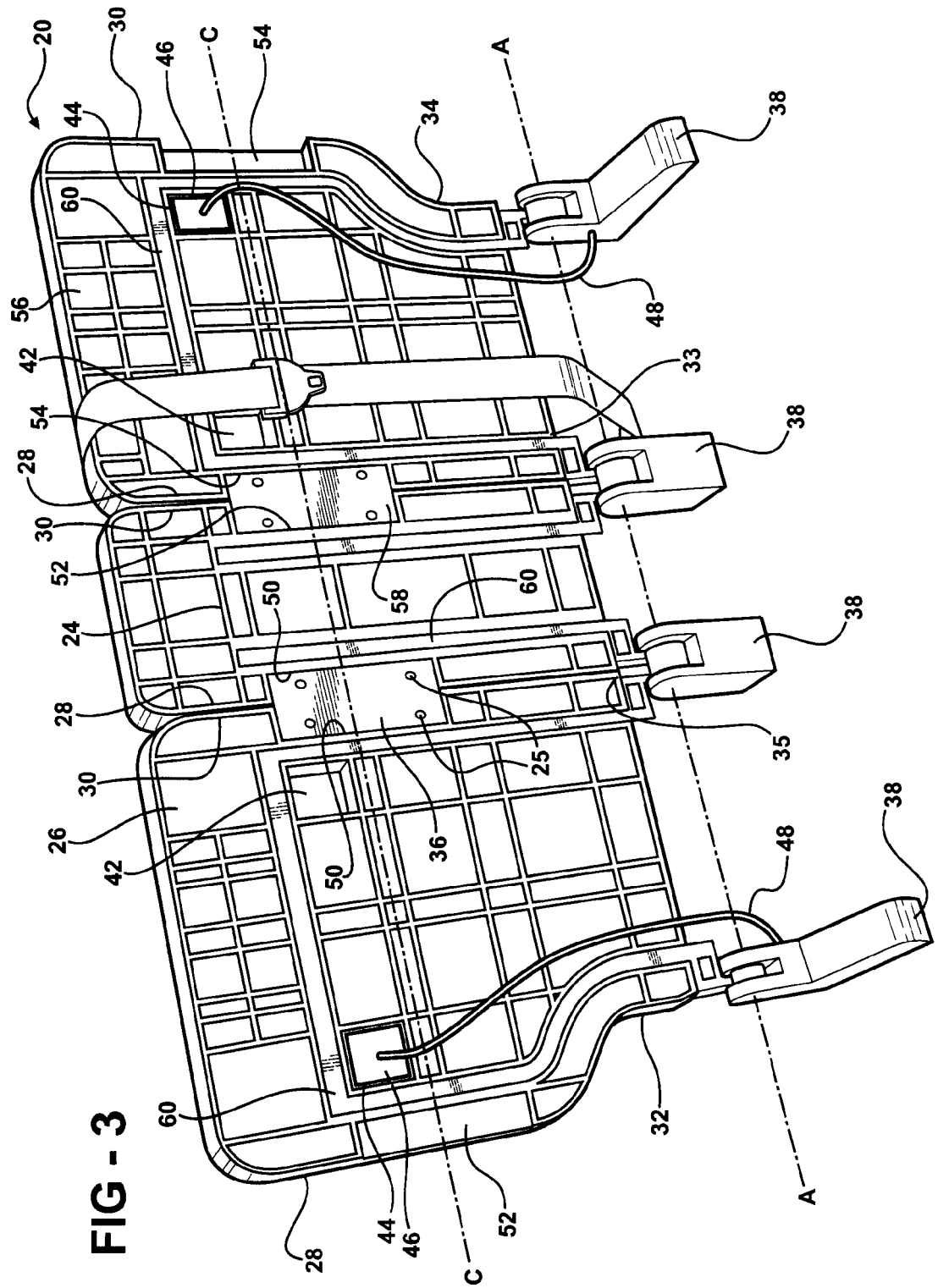
FIG. 3 is a perspective view of a second embodiment of the modular seat back assembly.
Figure 4:
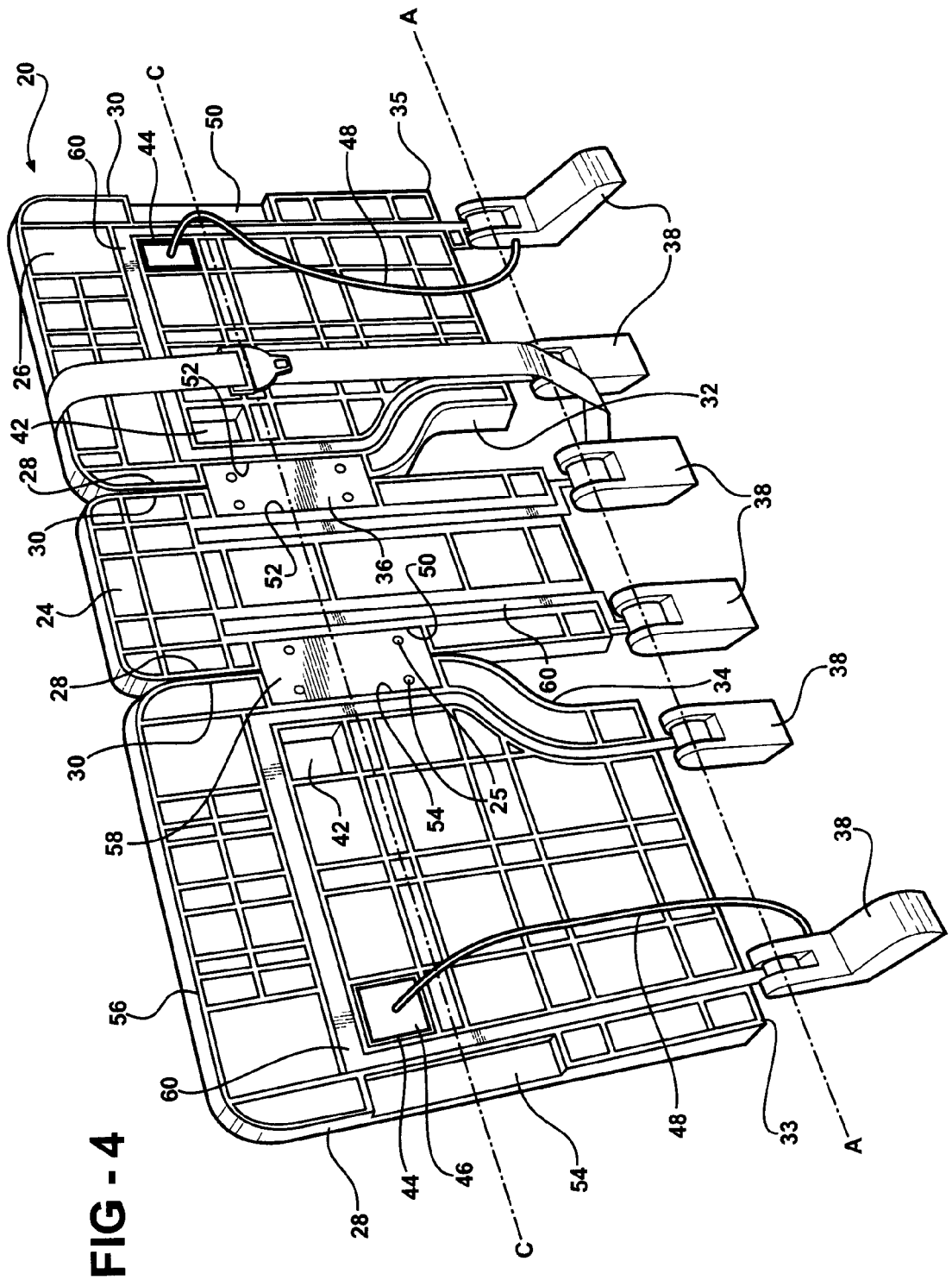
FIG. 4 is a perspective view of another arrangement of the second embodiment of the modular seat back assembly.
Figure 5:
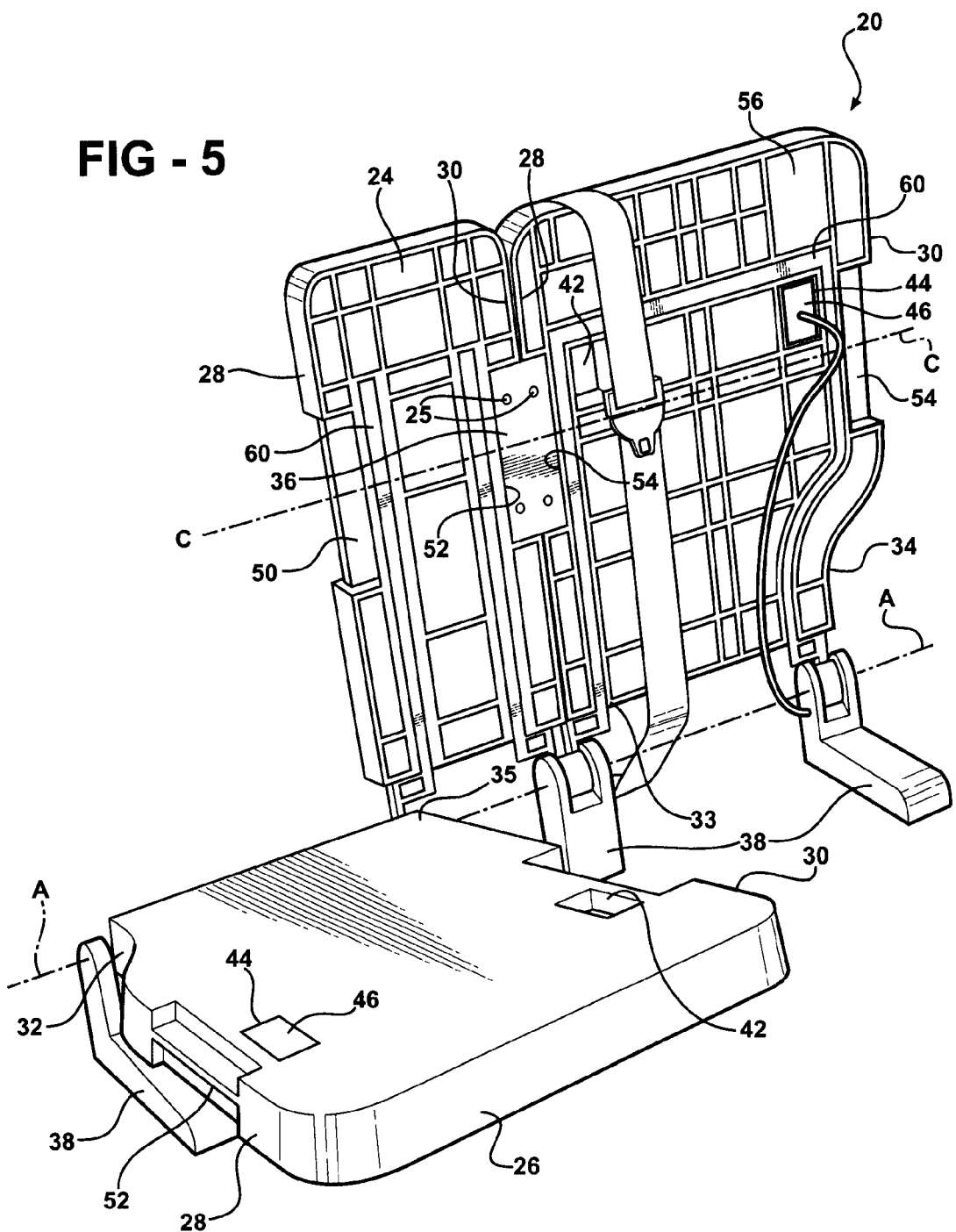
FIG. 5 is a perspective view of another arrangement of the second embodiment of the modular seat back assembly.
Figure 6:
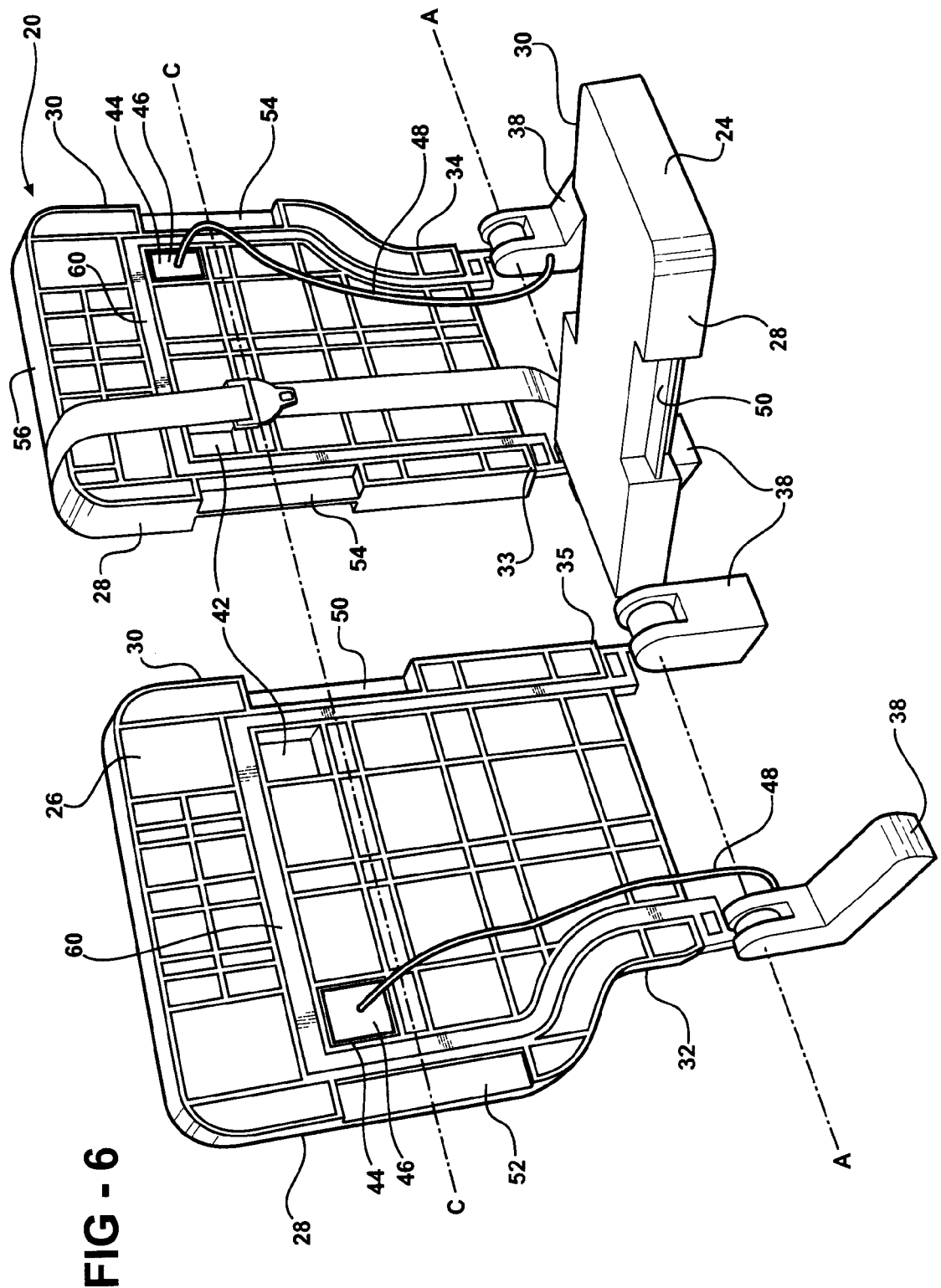
FIG. 6 is perspective view of another arrangement of the second embodiment of the modular seat back assembly.
Figure 7:
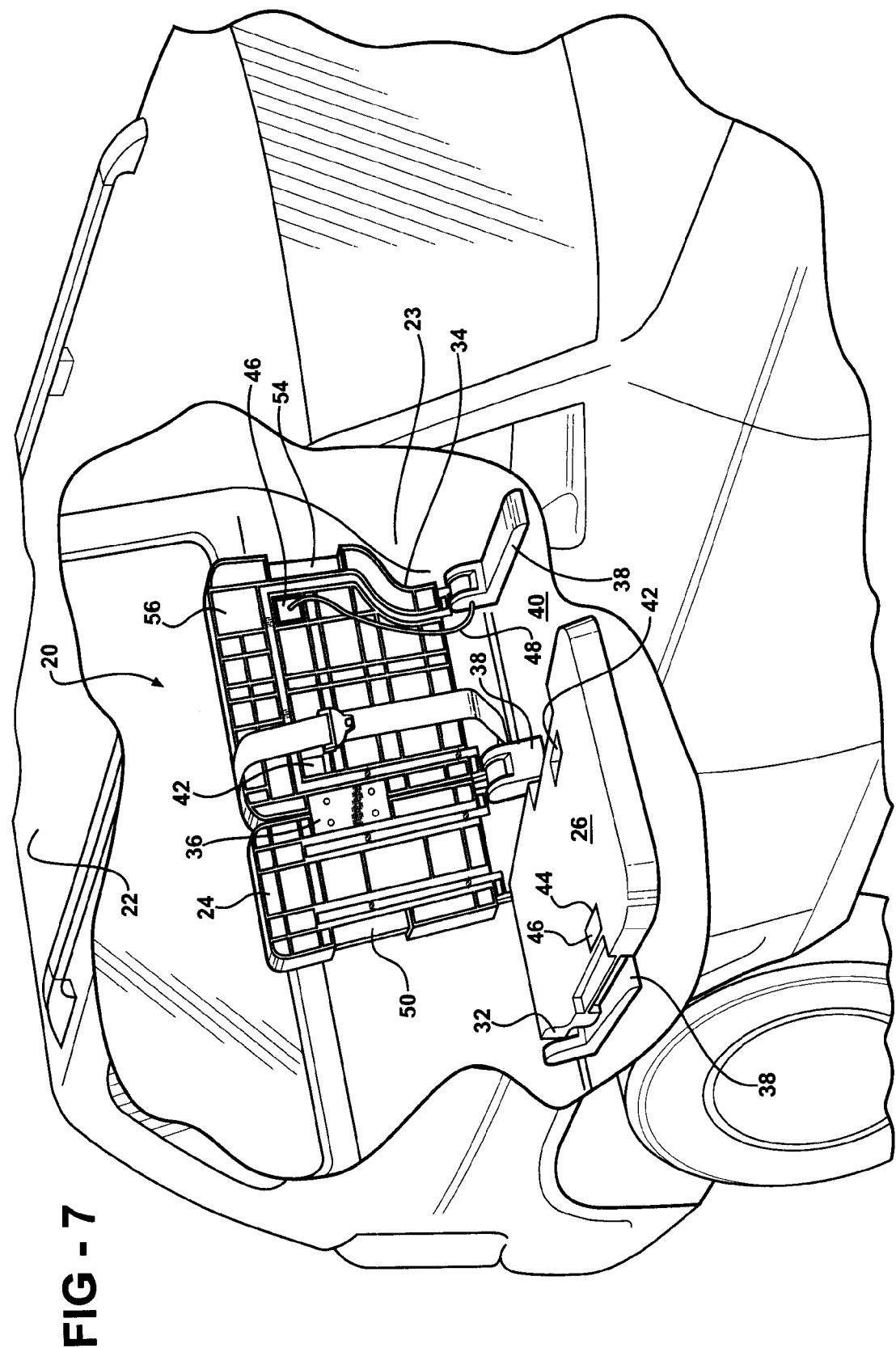
FIG. 7 is a perspective view of the second embodiment of the modular seat back assembly disposed in a vehicle.

As shown in FIGS. 3-6 and 7, the coupling member 36 is mounted to and extends from the first seat back 24 to the second seat back 26. As shown in FIGS. 5 and 7, the first and second seat backs 24, 26 are rotatable together relative to the third seat back 56 about the rotational axis A. The coupling member 36 rigidly attaches the first and second seat backs 24, 26 together such that the first and second seat backs 24, 26 rotate as a unit about the rotational axis A.

As shown in FIGS. 3-4, a second coupling member 58 is mounted to and extends from the third seat back 56 to one of the first and second seat backs 24, 26. The second coupling member 58 has the same configuration and dimensions as the coupling member 36 such that the coupling member 36 and the second coupling member 58 are interchangeable.

As shown in FIGS. 3-4, the second coupling member 58 is mounted to and extends from the third seat back 56 to the first seat back 24. In such an arrangement, the first, second, and third seat backs 24, 26, 56 are rotatable together about the rotational axis A. The coupling member 36 rigidly attaches the first and second seat backs 24, 26 together and the second coupling member 58 rigidly attaches the first and third seat backs 24, 56 together such that the first, second, and third seat backs 24, 26, 56 rotate as a unit about the rotational axis A.

In other words, the ability of the first, second, and third seat backs 24, 26, 56 to rotate relative to each other about the rotational axis A is dependent upon the arrangement of the seat back assembly. As shown in FIGS. 3-4, the coupling member 36 attaches the first and second seat backs 24, 26 and the second coupling member 58 attaches the first and third seat backs 24, 56 so that the first, second, and third seat backs 24, 26, 56 are rotatable together between the upright position and the folded position. Alternatively, as shown in FIG. 5, the coupling member 36 attaches the first and second seat backs 24, 26 and the third seat back 56 is free to rotate relative to the first seat back 24 such that the first and second seat backs 24, 26 are rotatable together about the rotational axis A relative to the third seat back 56 between the upright and folded positions. As shown in FIG. 6, each of the first, second, and third seat backs 24, 26, 56 are free to rotate relative to each other such that each of the first, second, and third seat backs 24, 26, 56 are independently rotatable between the upright and folded positions.

As shown in FIGS. 3-7, the third seat back 56 is mounted to the floor 40 of the vehicle 22 with the mount members 38. The third seat back 56 is rotatably mounted to the mount members 38 such that the rotational axis A extends through the mount members 38.

The second seat back 26 and the third seat back 56 each define the pair of apertures 42. The release mechanism 44 is disposed in at least one of the apertures 42. When in the upright position, the second and third seat backs 26, 56 are locked relative to the mount members 38 in the upright position. The release handle 46 is moved in the aperture 42 for unlocking the latch to unlock the second and third seat backs 26, 56 relative to the mount members 38 and to allow the second and third seat backs 26, 56 to rotate relative to the mount members 38 between the upright and folded positions.

The third seat back 56 defines a third pair of coupling bases 54 spaced from each other. One of the third pair of coupling bases 54 extends from the right end 30 of the third seat back 56 toward the left end 28 of the third seat back 56 and another of the third pair of coupling bases 54 extends from the left end 28 of the third seat back 56 toward the right end 30 of the third seat back 56.

The third pair of coupling bases 54 is configured such that the second coupling member 58 is mountable to one of the third pair of coupling bases 54 and to one coupling base of the first and second pair of coupling bases 50, 52. Specifically, the third pair of coupling bases 54 is configured with each of the third pair of coupling bases 54 are disposed along the common axis C. As such, the coupling member 36 is mountable to any two adjacent mounting bases 50, 52, 54 when the first, second, and third seat backs 24, 26, 56 are arranged in any arrangement relative to each other, i.e., with the left and right sides of any of the seat backs 24, 26, 56 adjacent any one of the left and right sides of either of the other seat backs 24, 26, 56. Likewise, the second coupling member 58 is mountable to any two adjacent mounting bases 50, 52, 54 when the first, second, and third seat backs 24, 26, 56 are arranged in any arrangement relative to each other.

Each of the third pair of coupling bases 54 is planar. The second coupling member 58 is further defined as a second plate. The second plate abuts a pair of adjacent mounting bases 50, 52, 54. The second plate is formed of metal and specifically is formed of aluminum. It should be appreciated that the second plate may be formed from any suitable material for rigidly attaching any of the first, second, and third seat backs 24, 26, 56 together without departing from the nature of the present invention. It should also be appreciated that the first, second, and third coupling bases 50, 52, 54 and the coupling member 36 and the second coupling member 58 may be formed in any configuration such that the coupling member 36 and the second coupling member 58 are mountable to the mounting bases 50, 52, 54 without departing from the nature of the present invention.

The first, second, and third seat backs 24, 26, 56 and the coupling member 36 and second coupling member 58 may be positioned in several different arrangements for various configurations of vehicles 22, i.e., second or third row seating and configurations with and without wheel wells. As known to one skilled in the art, second row seating refers to a row of seats behind a driver seat of the vehicle 22 and the third row seating refers to a row of seats behind the second row seating. Each arrangement will be discussed below and, for example, the arrangements include, among others, second row bench seating, second row 60/40 seating, second row 40/20/40 seating, third row bench seating, and third row 50/50 seating. As appreciated by one skilled in the art, the dimensions of these exemplary spits are approximate, e.g., in the 50/50 split both seat backs are approximately equal in width between the left and right ends 28, 30. It should be appreciated that these split ratios are exemplary and that the split ratio may be of any magnitude. In addition each of these arrangements may be configured for a vehicle 22 with or without wheel wells.

In the second row bench seating, the first, second, and third seat backs 24, 26, 56 are attached to one another with the coupling member 36 and the second coupling member 58 as shown in FIGS. 3-4. In the second row 60/40 seating, the coupling member 36 couples the first and second seat backs 24, 26 and the third seat back 56 is free to rotate relative to the first and second seat backs 24, 26 as shown in FIG. 5. In the second row 40/20/40 seating, the first, second, and third seat backs 24, 26, 56 are free to rotate relative to each other as shown in FIG. 6. In the third row bench seating, the modular seat back assembly 20 includes the first and second seat backs 24, 26 and not the third seat back 56 and the first and second seat backs 24, 26 are attached to one another by the coupling member 36 as shown in FIGS. 1-2. In the third row 50/50 seating, the modular seat back assembly 20 includes the first and second seat backs 24, 26 and not the third seat back 56 and the first and second seat backs 24, 26 are free to rotate relative to each other.

As shown in FIGS. 1-7, the first, second, and third seat backs 24, 26, 56 each include reinforcing ribs. The reinforcing ribs define the first and second pairs of coupling bases 50, 52, 54. Each of the coupling bases 50, 52, 54 extend from a perimeter of the seat back and between reinforcing ribs.

The first, second, and third seat backs 24, 26, 56 are formed of a plastic material and specifically a thermoplastic material. For example, the thermoplastic material comprises nylon such as fiber reinforced nylon. An example of such fiber reinforced nylon is a glass fiber reinforced nylon that is commercially available from BASF Corporation in Florham Park, N.J. under the tradename Ultramid® TG7S PA6. It should be appreciated that the first, second, and third seat backs 24, 26, 56 may be formed from any type of suitable thermoplastic material, reinforced or not, without departing from the nature of the present invention. The thermoplastic material is such that the modular seat back assembly 20 is able to with meet regional crash and safety tests such and front and rear end crash tests and cargo retention tests. For example, such tests include Federal Motor Vehicle Safety Standards such as FMVSS 208 in the United States and include ECER17 in the European Union.

Each of the first, second, and third seat backs 24, 26, 56 are typically injection molded to meet pre-determined design considerations, and can therefore fully incorporate a headrest guide, an armrest mount, the release mechanism 44, a load floor surface, a load floor 40 structure, and a seatbelt guide all into one fully integrated seat back providing sufficient strength and stiffness to meet those pre-determined design considerations.

As shown in FIGS. 1-7, the seat back assembly may include reinforcing tubes 60 coupled to the first, second, and third seat backs 24, 26, 56. The reinforcing tubes 60 are formed of metal and more specifically steel. The reinforcing tubes 60 are attached to the mount members 38 and supports the respective first, second, and third seat backs 24, 26, 56. The reinforcing tubes 60 are connected to the seat back with compression limiters and bolts at the mount member 38. The reinforcing tubes 60 provides the necessary strength and ductility for the seat backs 24, 26, 56 to meet the necessary crash load requirements. Together, the seat backs 24, 26, 56 and reinforcing tubes 60 meet the crash load requirements for a seat back assembly, while weighing less than a prior art all metal component seat back assembly and costing less to produce than the all metal component seatback assembly.

A structural snap-fit is utilized to attach the reinforcing tube 60 to the seatback 24, 26, 56 in the horizontal plane. The snap fit permits the reinforcing tube to slip in the cross-vehicle direction (horizontal plane), which allows the reinforcing tube 60 to take the crash loads while not failing the seat back.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A modular seat back assembly for a vehicle, said modular seat back assembly comprising:

a first seat back;

a second seat back adjacent said first seat back with said first and second seat backs selectively positionable relative to each other in a first seating arrangement and a second seating arrangement different than said first seating arrangement; and a coupling member extending from said first seat back to said second seat back and mounted to said first and second seat backs;

said first and second seat backs each presenting one of a first pair of coupling bases with said first pair of coupling bases configured such that said coupling member is mountable to both of said first pair of coupling bases when said first and second seats are in said first seating arrangement;

said first and second seat backs each presenting one of a second pair of coupling bases spaced from each of said first pair of coupling bases with said second pair of coupling bases configured such that said coupling member is mountable to both of said second pair of coupling bases when said first and second seats are in said second seating arrangement.

2. The modular seat back assembly as set forth in claim 1 wherein each of said first and second pairs of coupling bases is disposed along a common axis.

3. The modular seat back assembly as set forth in claim 1 wherein each of said first and second pair of coupling bases is planar and wherein said coupling member is a plate abutting each of said first pair of coupling bases in said first seating arrangement and abutting each of said second pair of coupling bases in said second seating arrangement.

4. The modular seat back assembly as set forth in claim 1 wherein said first and second seat backs each include reinforcing ribs with said reinforcing ribs of each of said first and second seat backs defining said first and second pairs of coupling bases.

5. The modular seat back assembly as set forth in claim 1 wherein each of said first and second seat backs have a left end and a right end with said right end of said first seat back adjacent said left end of said second seat back in said first seating arrangement and with said left end of said first seat back adjacent said right end of said second seat back in said second seating arrangement.

6. The modular seat back assembly as set forth in claim 5 wherein one of said first pair of coupling bases extends from said right end of said first seat back toward said left end of said first seat back and another of said first pair of coupling bases extends from said left end of said second seat back toward said right end of said second seat back.

7. The modular seat back assembly as set forth in claim 5 wherein one of said second pair of coupling bases extends from said left end of said first seat back toward said right end of said first seat back and another of said second pair of coupling bases extends from said right end of said second seat back toward said left end of said second seat back.

8. The modular seat back assembly as set forth in claim 5 wherein said left end of said first seat back defines a wheel well cutout and wherein said right end of said second seat back defines a second wheel well cutout.

9. The modular seat back assembly as set forth in claim 5 wherein said first and second seat backs are substantially equal in length from said left end to said right end respectively.

10. The modular set back assembly as set forth in claim 1 wherein said first and second seat backs are rotatable together about a rotational axis.

11. The modular seat back assembly as set forth in claim 1 further comprising a third seat back disposed adjacent one of said first and second seat backs and extending between a right end and a left end with said third seat back defining a third pair of coupling bases spaced from each other.

12. The modular seat back assembly as set forth in claim 11 wherein said third seat back is rotatable about a rotational axis relative to said first and second seat backs between an upright position and a folded position and wherein said first and second seat backs are rotatable together about said rotational axis relative to said third seat back between said upright and folded positions.

13. The modular seat back assembly as set forth in claim 11 further comprising a second coupling member mounted to and extending from said third seat back to one of said first and second seat backs with said third pair of coupling bases configured such that said second coupling member is mountable to one of said third pair of coupling bases and to one coupling base of said first and second pair of coupling bases.

14. The modular seat back assembly as set forth in claim 13 wherein said first, second, and third seat backs are rotatable together between an upright position and a folded position.

15. The modular seat back assembly as set forth in claim 11 wherein said first, second, and third pairs of coupling bases are disposed along a common axis.

16. The modular seat back assembly as set forth in claim 11 wherein each of said first and second seat backs have a left end and a right end with both of said left and right ends of said first seat back being straight and with said left end of said third seat back defining a wheel well cutout and with said right end of said second seat back defining a second wheel well cutout.

17. The modular seat back assembly as set forth in claim 11 wherein said first and second seat backs have a left end and a right end and wherein said first and third seat backs are substantially equal in length from said left end to said right end respectively and each of said first and third seat backs are substantially twice as long as said first seat back from said left end to said right end respectively.

18. The modular seat back assembly as set forth in claim 1 further comprising fasteners coupled to said coupling member with each fastener engaging one of said first and second seat backs.

19. The modular seat back assembly as set forth in claim 1 wherein said first and second seat backs are formed of a thermoplastic material.

20. The modular seat back assembly as set forth in claim 19 further comprising reinforcing tubes coupled to said first and second seat backs.

21. The modular seat back assembly as set forth in claim 19 wherein said thermoplastic material comprises nylon.

22. The modular seat back assembly as set forth in claim 19 wherein said nylon comprises fiber reinforced nylon.

23. The modular seat back assembly as set forth in claim 19 wherein said first and second seat backs are formed by injection molding.

24. A modular seat back assembly for a vehicle, said modular seat back assembly comprising:

a first seat back defining a wheel well cutout;

a second seat back adjacent said first seat back and defining a second wheel well cutout with said first and second seat backs selectively positionable relative to each other in a first seating arrangement and a second seating arrangement different than said first seating arrangement; and a coupling member extending from said first seat back to said second seat back and mounted to the first and second seat backs;

said first and second seat backs each presenting one of a first pair of coupling bases with said first pair of coupling bases disposed along a common axis and configured such that said coupling member is mountable to both of said first pair of coupling bases when said first and second seats are in said first seating arrangement;

said first and second seat backs each presenting one of a second pair of coupling bases spaced from each of said first pair of coupling bases with said second pair of coupling bases disposed along said common axis and configured such that said coupling member is mountable to both of said second pair of coupling bases when said first and second seats are in said second seating arrangement.

* * * * *